United States Patent [19]
Koller et al.

[11] Patent Number: 5,904,065
[45] Date of Patent: May 18, 1999

[54] WALKING BEAM DRIVE APPARATUS

[75] Inventors: Frank H. Koller, Norridge; Don G. Sandrock, McHenry, both of Ill.

[73] Assignee: Emerson Electric Co., St. Louis, Mo.

[21] Appl. No.: 08/980,177

[22] Filed: Nov. 26, 1997

[51] Int. Cl.[6] .............................. F16H 25/12; F16H 25/08
[52] U.S. Cl. ...................................... 74/57; 74/53; 74/54
[58] Field of Search .................................. 74/53, 54, 57, 74/569

[56] References Cited

U.S. PATENT DOCUMENTS

| | | |
|---|---|---|
| 3,703,834 | 11/1972 | Beezer . |
| 3,731,545 | 5/1973 | Beezer ..................................... 74/57 X |
| 3,751,996 | 8/1973 | Beezer . |
| 3,779,089 | 12/1973 | Beezer . |
| 3,865,253 | 2/1975 | Healy ....................................... 74/57 X |
| 3,881,362 | 5/1975 | Beezer . |
| 4,166,527 | 9/1979 | Beezer . |
| 4,223,781 | 9/1980 | Beezer . |
| 4,227,851 | 10/1980 | Beezer . |
| 4,599,909 | 7/1986 | Koller ...................................... 74/53 X |
| 4,799,405 | 1/1989 | Beezer et al. . |
| 4,881,356 | 11/1989 | Beezer et al. . |

OTHER PUBLICATIONS

Advanced Linear Motion Technology Guide, Thomson brochure, cover page and pp. 10 and 16.
Building Blocks for Automation, Stelron Components, Inc. brochure.
Stelron Modular Walking Beam Assembly Machine Chassis, Stelron Components, Inc. brochure.

*Primary Examiner*—John A. Jeffery
*Assistant Examiner*—Brandon C. Stallman
*Attorney, Agent, or Firm*—Tilton, Fallon, Lungmus & Chestnut

[57] ABSTRACT

A fully enclosed cam-actuated drive device for providing both lift and translational movements, incorporating protection against damage in either horizontal or vertical overload situations, achieved by providing optional spring protection along the vertical and/or horizontal axes, a roller gear cam for lift motion, a barrel cam for translational motion, translation guide rods, a translational carriage assembly slidably received on the translation guide rods, an input drive shaft, and vertical lift rods. The device may be configured as a walking beam device to impart a U-shaped output motion, or alternatively a closed box-shaped motion, as desired. A split carriage assembly reduces backlash of the device and a sliding dust cover prevents foreign objects from entering the drivers cam-actuated internal operating structure.

35 Claims, 12 Drawing Sheets

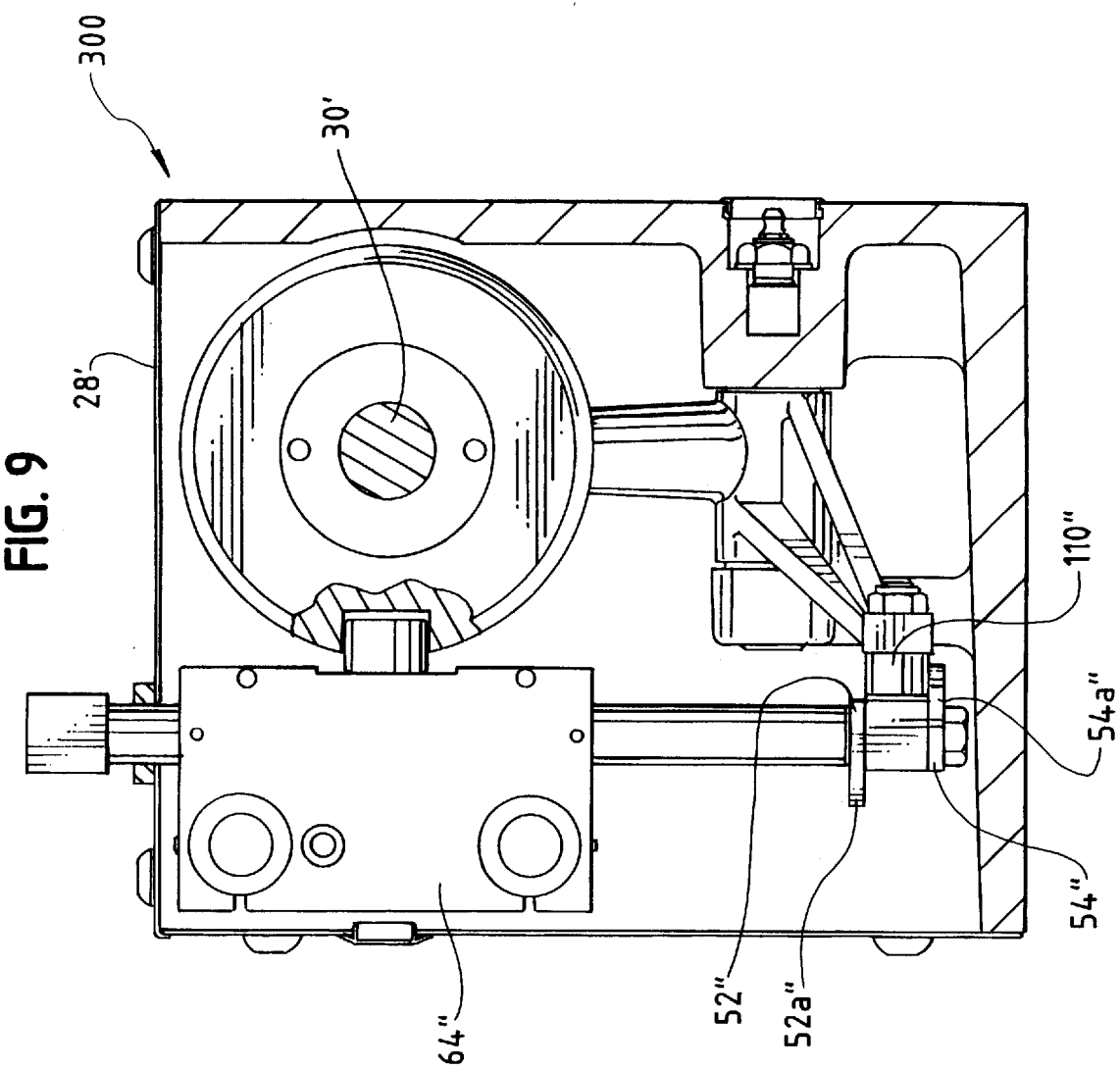

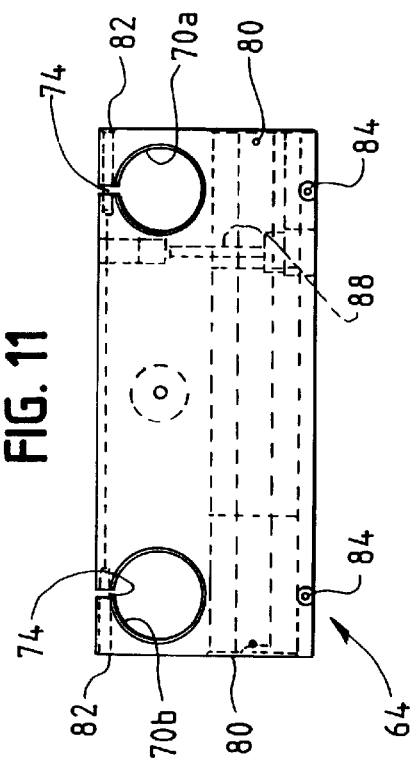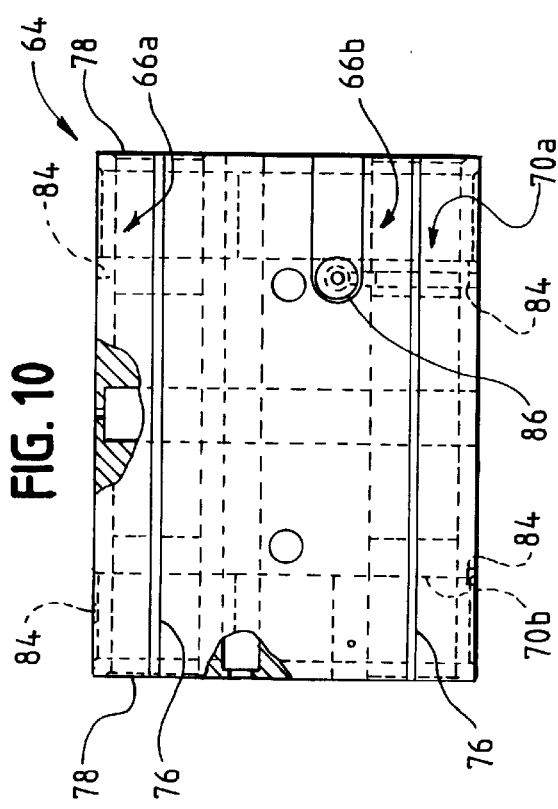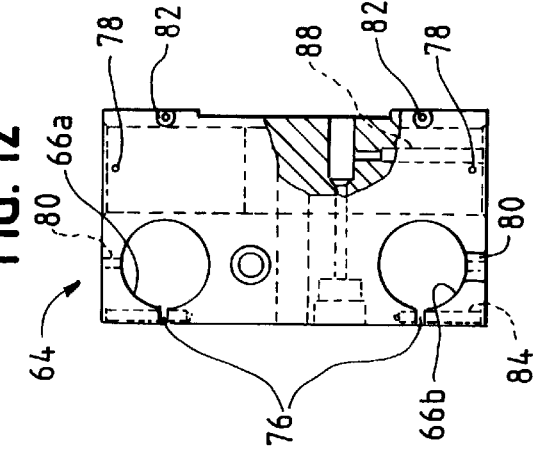

WALKING BEAM DRIVE APPARATUS

FIELD OF THE INVENTION

This invention relates to cam-actuated drive devices, such as for walking beam assemblies, and particularly drives that provide both lift and translation output movements.

BACKGROUND OF THE INVENTION

There are many applications in workpiece manufacture and parts assembly where a cam-actuated drive device is needed to provide both lift and translation movements. For example, walking beam assemblies need a drive which will both lift a part or tooling nest from one work station location, proceed through translation, i.e. horizontal movement, to a second location, and then lower the part or tooling nest to a second work station. Alternatively, such two direction drives can be utilized to progressively move conveyor systems, such as where a pair of fingers are moved outwardly to a first direction to engage, i.e. mechanically "spear", a segment of a conveyor belt system, the pair of fingers are then translated linearly along a second direction (and thereby move all sections of the conveyor from a first to a second position), next they are retracted from the conveyor system, and then are linearly moved back to a "start" or home position. In that fashion, such a conveyor drive unit operates to continuously index the conveyor forward section by section. Yet further, such two-direction drive devices can be used as part transfer mechanisms in pick-and-place assembly units.

However, unless protected, such two-direction, cam-actuated drive devices are unfortunately subject to damage should, for example, a jam occur, such as in the associated tooling, or with the tooling mounting block that is driven by the drive device. Thus, whether in a vertical lift (i.e. extension) mode, or a vertical retract (i.e. lowered) mode, or in either of the horizontal translation modes, such drive devices can suffer serious damage should jams occur. This can include damage to the roller followers, or directly to the drive cam members Thus, such unprotected cam-actuated drives are always subject to damage, even when micro switch-type overload protection sensors are used with the associated tooling.

Accordingly, there is a ongoing need for a protected, cam-actuated drive device for use with walking beam assemblies. One such known drive, with protection against jam-created damage available in one vertical direction, is manufactured and distributed by Stelron Components, Inc., of Hahwah, N.J.; it is sold under Stelron trademarks "ST" and "SBT" Translator series. (An older, "unprotected" version is sold under Stelron's "T Series" trademark.) However, this prior design for protected cam-actuated drives has several disadvantages. First, the carriage assembly (through which the respective lift rods oscillate and which itself oscillates along the horizontal translation guide bars), is of a relatively short width, i.e. short span. That, in turn, affects the overall stability of the associated tooling. Second, the available translation stroke, i.e. horizontal movement, as provided by such a prior design is compromised by the fact that there is blocking structure, i.e. lift cam and bell crank structure, that obstructs any otherwise full horizontal translation of the carriage (in the extension direction). That is, because the lift arm structure sits out to the side of the lift barrel cam, it partially blocks the carriage's extension movement.

Third, with such prior devices, there is spring protection (against jams) provided only in the Y (vertical) axis, i.e. none along the X (horizontal translation) axis. Further, the available Y axis spring protection is limited to the raised or extension mode, i.e. no spring protection is available in the lowered or retraction mode.

Fourth, even with such prior (Y axis) "protected" walking beam drive designs, the protection spring structure is, at least partially, outwardly exposed to the operating environment. That presents potential human safety concerns, i.e. one's fingers can be caught up in the spring area. Further, potential damage can occur to such exposed spring structure, such as by broken parts, jammed tooling, and the like. Also, if they become broken, spring parts flying about could present a safety hazard.

SUMMARY OF THE INVENTION

The foregoing problems in the prior art are obviated with the present invention which uses a fully enclosed drive unit, i.e. where no exterior operating components exist to create safety concerns, and where all openings in the unit's housing are sealed or otherwise covered for protection. The present fully enclosed two direction drive unit can be formed in several versions to accommodate the end user's needs, either as a standard unit (with no built-in spring protection against damage), or with available spring "protection" in the fully raised Y axis position, or instead, in the fully lowered Y axis positions Additionally, unlike the prior designs, spring protection is also provided in the full (X axis) translation position. Further, whether made in the standard or in a protected version, standard components can be used, thereby minimizing overall manufacturing and assembly costs.

Further, a roller gear cam arrangement is used for the lift cam portion of the present invention's cam drive. This, in turn, allows the associated lift arm structure to be totally positioned under the roller gear cam component. Thus, the same remains out of the way of the translating carriage assembly, whereby full width translation (i.e. within the unites housing) is available to provide an elongated translation stroke. Also, this permits the carriage block to be relatively longer, i.e. wider, which permits more stability to the tooling mounting plate. If desired, the lift and translation cams can be made as a unitary component such as for smaller size drive units, or instead can be made as separate units operating on a common drive shaft, such as for large dimension and heavy duty applications. Also, as may be desired for a given walking beam drive or conveyor application, the cam sections 36 and 38 can be specially configured so as to provide either an overall "U-shaped" motion, or instead a "closed box-shaped" motions for the output motion of drive apparatus 20 (as seen by the associated tooling mounting plate).

A novel split carriage assembly is used which permits an effective pre-loaded interference fit between the respective ball bushing bearing assemblies and the respective lift and translation guide rods. This substantially eliminates any unwanted backlash movements within such components. This is especially important to the drive unites overall accuracy, since carriage backlash is a major component of the total backlash typically present in such units, including even the backlash present in the roller followers.

A sliding dust cover, which is spring-urged down against the unit's top cover plate, operates to close off a slotted opening through which the vertical lift guide rods are horizontally translated during each cycle. The cover prevents dust, debris, broken parts, and other items from entering and jamming the drivers internal operating structure. It also provides a human safety feature, i.e. it prevents entry of one's fingers into the unit's operating interior.

Further, because the protection spring members are fully enclosed within the unit's housing, there is no potential danger of having broken spring parts thrown externally of the unit. Overall, the present drive unit is of low cost to manufacture and assemble, has long bearing life, and produces minimal unwanted backlash.

The means by which the foregoing and other aspects of the present invention are accomplished, and the manner of their accomplishment, will be readily understood from the following specification upon reference to the accompanying drawings, in which:

FIG. 9 is a section view (similar to FIGS. 4 and 7), but of the further modified unit of FIG. 8;

FIGS. 10, 11 and 12 are respective enlarged side, top plan, and end views of the present drive's carriage block assembly;

DESCRIPTION OF THE PREFERRED EMBODIMENT

Figure 1:
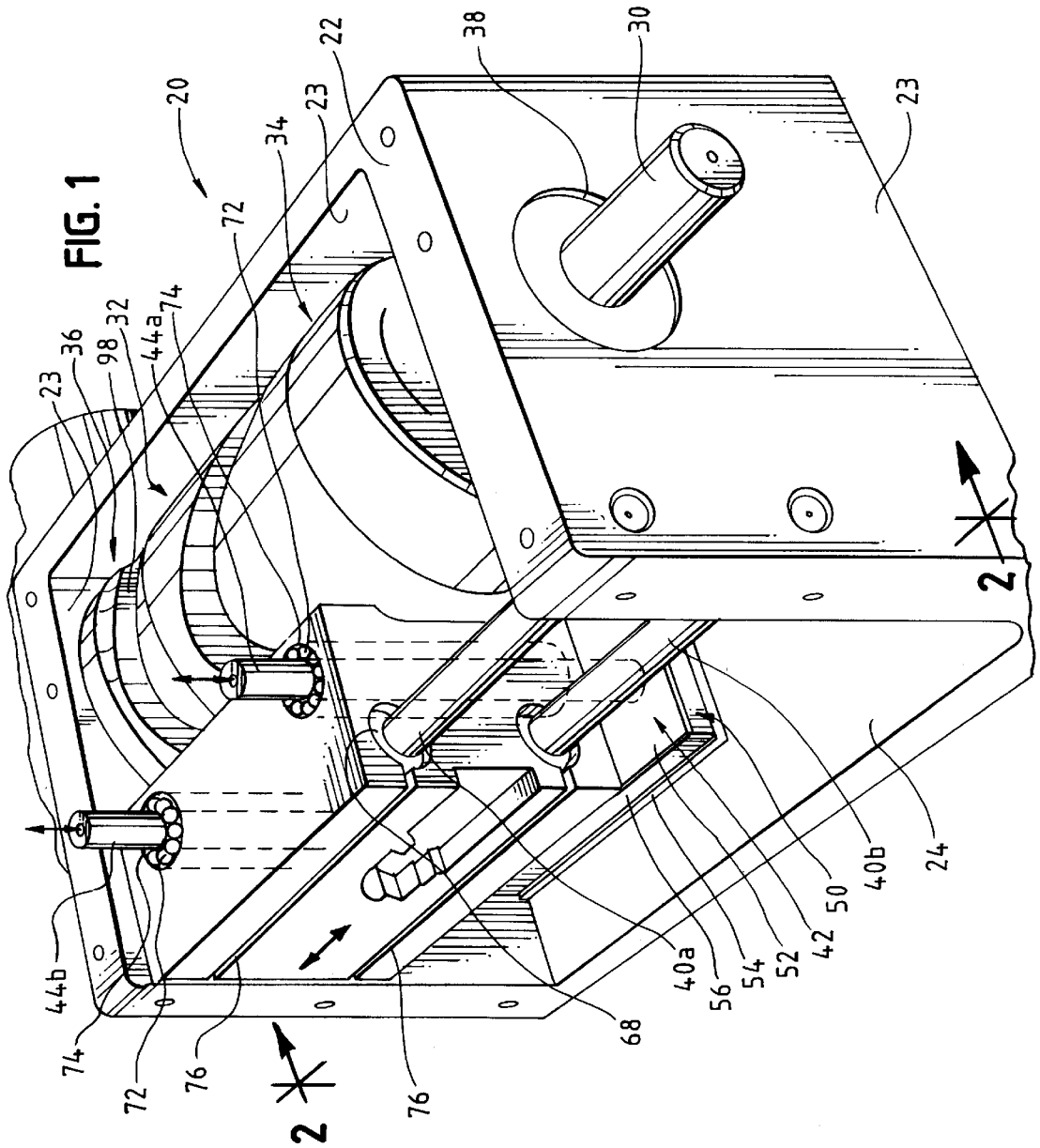
FIG. 1 is a perspective view of the improved walking beam drive device of the present invention (shown in the standard version format), with the side and top cover plates removed for better viewing.
Figure 2:
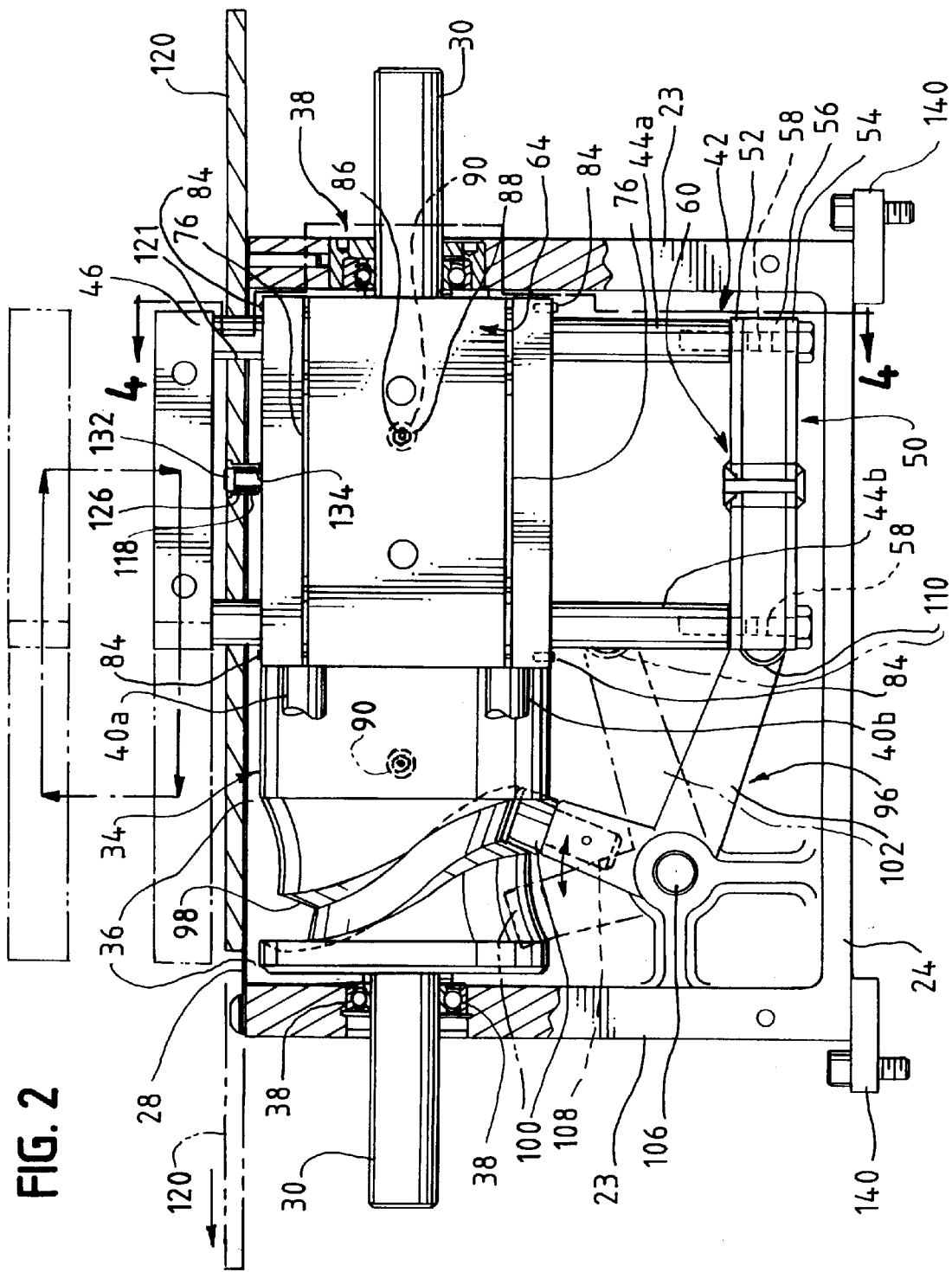
FIG. 2 is a side elevation view of the drive device of FIG. 1, with certain parts shown in phantom in other operating positions
Figure 3:
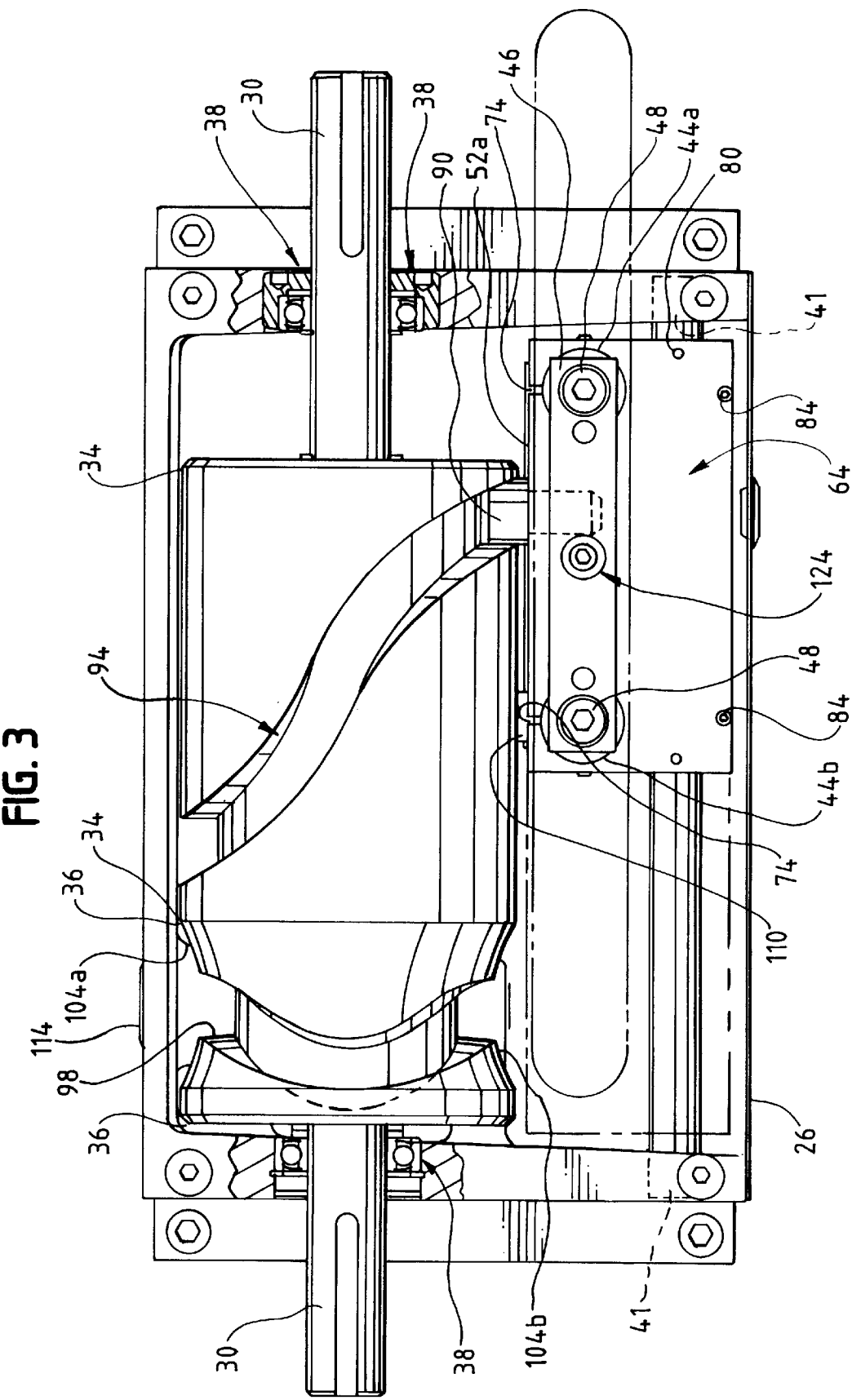
FIG. 3 is a top plan view of the drive unit of FIG. 1.

Having reference to the drawings, wherein like reference numerals indicate corresponding elements, there is shown in FIG. 1 the walking beam drive apparatus of the present invention, as generally noted by reference numeral 20. Drive apparatus 20 includes a three sided housing 22, preferably formed as a cast and a machined aluminum unit, having side walls 23 and a base section 24. A side cover 26 and top cover 28, such as formed from appropriately stamped sheet metal members, are seen in FIGS. 2 and 3; they have been removed from housing 22 for better viewing in FIG. 1. An input drive shaft 30 is rotatably driven through an appropriate reducer (not shown) by a drive motor (not shown). The input drive shaft 30 is rotatably supported, by the respective side walls 23 of housing 22, via roller bearing assemblies 38. Preferably, a unitary cam member 32 is formed with two cam sections, namely a translation cam section 34 and a lift cam section 36 (see FIG. 3). Preferably, the translation cam section 34 comprises a barrel cam, while the lift cam section 36 comprises a roller gear cam (contrary to the prior known devices use of barrel-type lift cams).

A pair of horizontal translation guide rods 40a, 40b are affixed via interference fit into bores 41 (see FIG. 3), to the housing side walls 22. The guide rods 40a, 40b are preferably formed of hardened steel with a polished surface and minimal waviness.

A lift guide rod assembly generally denoted by reference numeral 42, comprises respective vertical lift guide rods 44a, 44b (formed similarly to guide rods 40a, 40b) a tooling mounting plate 46 fastened via fasteners 48 to the respective top ends of lift guide rods 44a, 44b, and a lift track assembly (generally noted by reference numeral 50). Assembly 50 comprises an upper lift track plate 52e a lower lift track plate 54 and a plate spacer 56; these lift track components are respectfully assembled and fastened to the lower respective ends of the lift guide rods 44a, 44b by fasteners 58. A bevel washer fastener assembly, generally denoted by reference numeral 60e, spans and further holds together the respective upper and lower lift track plates, 52, 54. Thus, as best seen in FIG. 4, the lift track assembly 50, and particularly the lift track plate extensions 52a, 54a, cooperate to create a lift guide track, as generally denoted by reference numeral 62.

Figure 4:
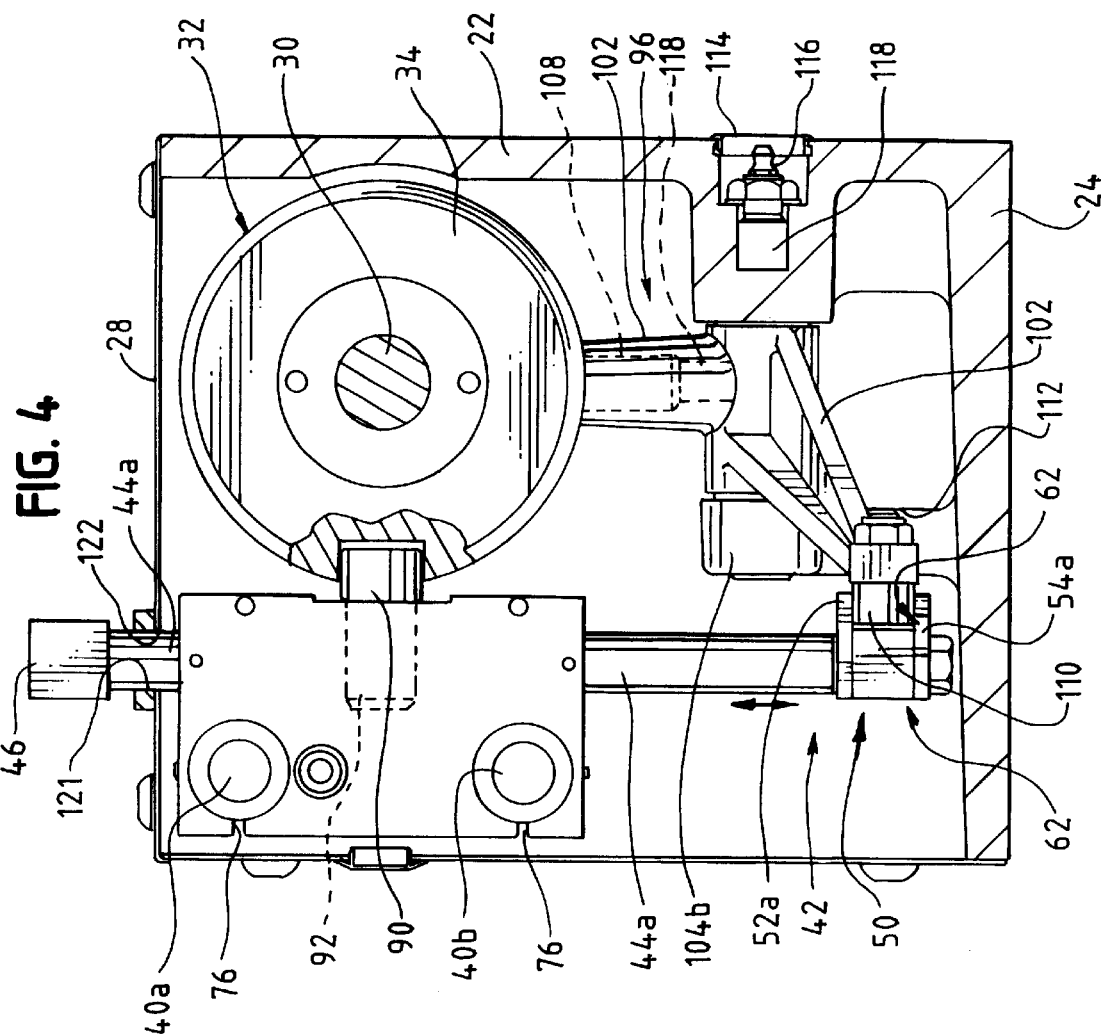
FIG. 4 is a section views taken along lines 4—4 of FIG. 2e, and additionally showing side and top cover plate structure.

As best seen in FIGS. 2–4, and also FIGS. 10–12, a split carriage member 64 is mounted for horizontal translation (i.e. right to left, back and forth movement, see arrows in FIG. 2) upon and along the translation guide rods 40a, 40b. As seen in FIG. 12, the carriage 64 includes a pair of translation bores 66a, 66b which receive respective translation ball bushing bearing assemblies 68. Additionally, see FIGS. 1 and 11 the carriage 64 also includes a pair of lift bores 70a, 70b, for receiving respective lift ball bushing bearing assemblies 72. The split carriage 64 also includes lift bushing slots 74 and translation bushing slots 76 as aligned with bores 66a, 66b and bores 70a, 70b, respectively (see FIGS. 10–12). Thus, due to the lift bushing slots 74 and translation bushing slots 76, the carriage 64 becomes a so-called "split" carriage.

In operation, the vertical lift guide rods 44a, 44b are slidably received within, and move vertically relative to, the ball bushing bearing assemblies 72 as maintained within the respective lift bores 70a, 70b of carriage 64. Similarly, due to the presence of translation bores to 66a, 66b and translation ball bushing bearing assemblies 68, the split carriage 64 is operable to slidably translate horizontally along the translation guide rods 40a, 40b.

Preferably, the respective ball bushing bearing assemblies 68, 72 are formed of a special configuration, i.e. they are formed to have essentially twice the number of ball bearings and raceways as normally present in such ball bearing units. This allows them to be self-aligning, and to follow any waviness as may be present in the mating guide rods without undue wear. All this is helpful so that there is minimal drag present in the translation and lift movements of the various components of the present drive. Such special ball bushing bearings are also used so as to help reduce overall backlash, i e. that normally present inherent dimensional and free movement, between the mating components. One such commercially available special ball bushing bearing assembly is made by Thomson Industries, Inc., of Port Washington, N.Y., and sold as their "Super Smart" (trademark) ball bushing bearings. Due to the present drivers unique construction, such ball bushing bearings 68, 72 are able to be pre-loaded via tightening of split carriage 64, i.e. to be forced inwardly against the outer surface of the respective mating translation guide rods 40a, 40b, and of the mating vertical lift guide rods, 44a, 44b.

More specifically, during drive unit assembly, portions of the split carriage 64, particularly along the respective lift bushing slots 74 and translation bushing slots 76, can be tightened about the respective ball bushing bearing assembly 68, 72 to affect appropriate pre-loading of the respective lift guide rods 44a, 44b, and translation guide rods 40a, 40b. As seen in FIGS. 10–12, bearing retention fasteners 78 are used to hold the lift ball bushing bearing assemblies 72 (for lift guide rods 44a, 44b) in place within carriage 64; similarly, bearing retention fasteners 80 are utilized to hold in place the respective translation ball bushing bearing assemblies 68 (for translation guide rods 40a, 40b).

Further, and of importance relative to the pre-loading feature for the ball bushing bearing assemblies, respective pre-loading fasteners 82 are used to tighten the respective slotted portions of split carriage 64, i.e. to tighten and close lift bushing slots 74 and respective bores 70a, 70b about the respective lift ball bushing bearing assemblies 72. Similarly, additional pre-loading fasteners 84 are utilized to tighten the translation bushing slots 76 and translation bores 66a, 66b about the translation ball bushing bearing assemblies 68.

As seen in FIGS. 2–3 and 10–12, the split carriage 64 is fitted with a grease fitting 86 which communicates, via grease supply bores 88, to roller follower 90.

As seen in FIGS. 3–4, a roller follower 90 is mounted via fastener 92 to the internal side of carriage 64, and hence, operates to be engaged within, and driven by, the barrel cam track 94 of translation cam section 34. Preferably, the barrel cam track 94 is formed as a single cycle-single cam track. That is, one rotation of input shaft 30, and hence of barrel section 34, causes one full translation cycle of the carriage block 64. Thus, during one cam cycle, the carriage 64 moves horizontally, right to left, and then back to the right again, per the directional arrows in FIG. 2, as between the respective right and left phantom positions for roller follower 90 in that Figure.

An advantageous feature of the present invention resides in the location of the specific lift structure, i.e. that structure which translates the lift movement from lift cam section 36 to the lift track assembly 50. Due to the presence and use of a roller gear type cam for the lift cam section 36 the lift arm assembly (generally denoted by reference numeral 96) can be positioned directly underneath lift cam section 36. That is, it is intentionally placed out of the way of the horizontal translation movements of both split carriage 64 and lift track assembly 50.

More specifically, the roller gear lift cam section 36 comprises a single roller gear cam track 98 which operates to drive a single roller follower 100 between the extreme right and left positions therefore as depicted in FIG. 2. A lift arm bell crank 102 is supported off housing 22 via bearing journal supports 104a, 104b, and through a lift shaft 106. As seen (FIG. 2), the roller follower 100 is supported via fastener support 108 on the upper arm of the oscillating lift bell crank 102. Located at the outermost end of lower lift bell crank arm 102e, a drive roller follower 110 is supported via a stub shaft 112.

The drive roller follower 110 is captured (see FIGS. 2 and 4), in effect, between the respective upper and lower lift track plate extensions 52a, 54a. Further, because the captured drive roller follower 110 freely rotates on support shaft 112, drive roller follower 110 is free to roll along and within the lift guide track 62 (as it translates horizontally with carriage 64).

In operation, the driving rotation of roller gear lift cam 36 causes oscillation of lift arm bell crank 102 (via roller follower 100). (See the two extreme positions of roller follower 110 in FIG. 2.) Likewise, such oscillation of lift arm bell crank 102 causes drive roller follower 110 to oscillate between its lowermost vertical position (shown in solid lines in FIG. 2) and its uppermost vertical position (shown in phantom in FIG. 2). Such a driving vertical oscillation of drive roller follower 110, as captured within the lift guide track 62, in turn causes a raising and lowering, i.e. vertical drive movement, of the associated lift guide rod assembly 42e, and ultimately, of the tooling mounting block 46.

As seen in FIG. 3, a removable plastic cap 114 covers off a grease fitting 116 which communicates via grease supply bores 118 to the support shaft fastener 108 of roller follower 100.

Figure 15:
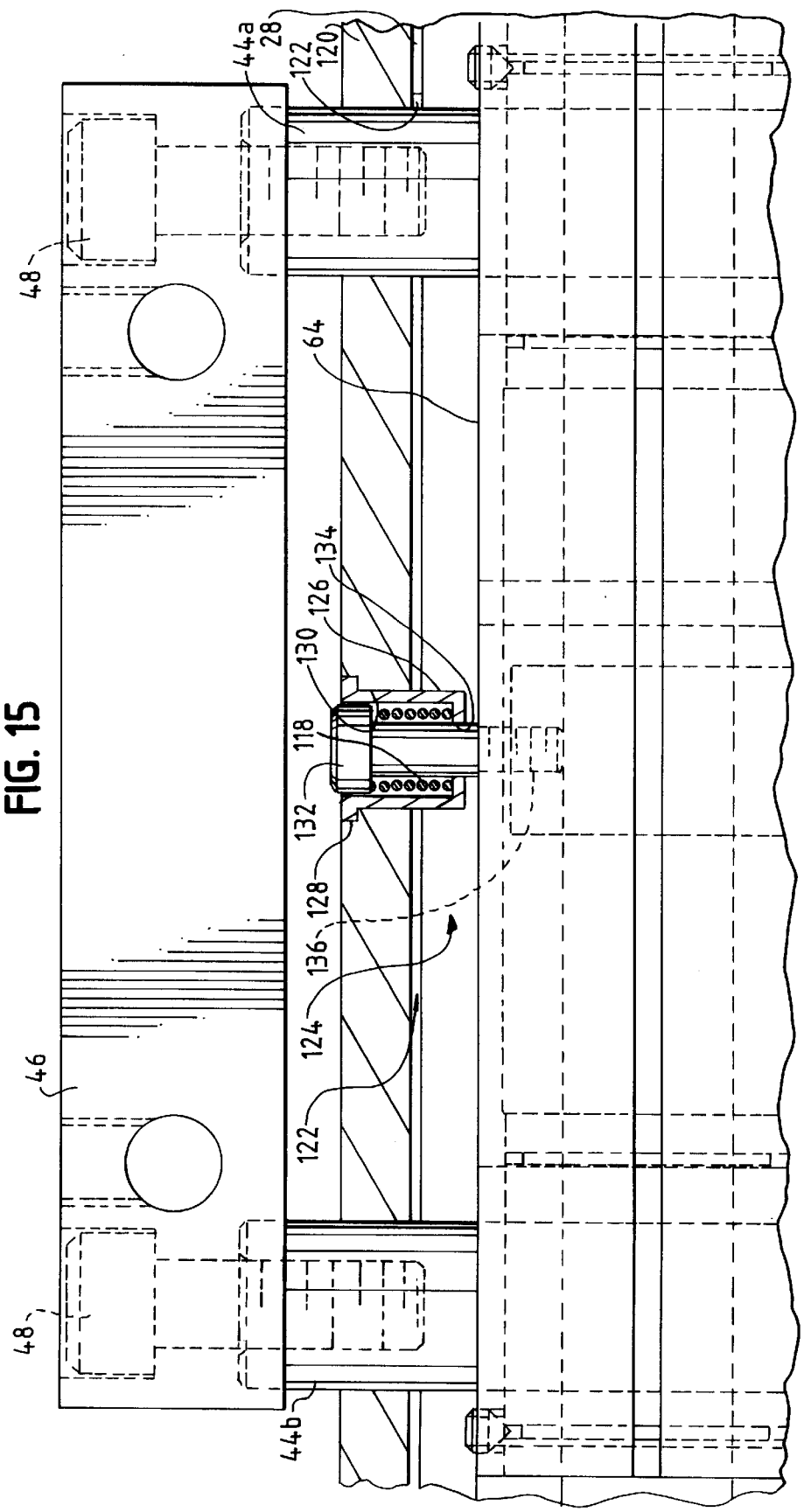
FIG. 15 is an enlarged partial section view of the sliding dust cover and mounting block structure of the drive unit of the present invention.

A sliding dust cover 120 achieves several things. It translates (horizontally) with the horizontal movement of the carriage block 64, it allows the lift guide rods 44a, 44b to vertically translate through it (via pilot openings 121), and it operates to cover off an elongated slot 122 and top cover 28 (see FIGS. 2–4, and 13). The dust cover 120, preferably made of a plastic material, such as DELRIN (trademark) plastic, is fastened to the upper end of carriage 64, by a spring cup assembly, generally denoted by reference numeral 124. Assembly 124 includes a spring cup 126 with flange 128 pressed into an opening 130 formed in dust cover 120. A shoulder screw fastener 132 is fitted through an opening 134 in the bottom of the spring cup 126, and threadingly fastened to a bore 136 in the top of carriage 64. As best seen in FIG. 15, a compression spring 138 is retained within spring cup 126 and operates to bias downwardly (via shoulder screw 132 and spring cup 126) the dust cover 120 against the top cover 28. Furthers the spring cup assembly 124 operates to drive the dust cover 120 horizontally across cover 28, i e. when the carriage 64 is translated by barrel translation cam section 34. Thus, such downwardly-biased, sliding, translating movements of dust cover 120 operate to continuously close off the elongated opening 122 of cover 28, and thus close off the interior of drive unit 20. This occurs regardless of whether cover 120 is in its full rightmost retracted position (see solid line position in FIG. 2), or through translation via carriage 64, in its full leftmost extension position (see phantom line position in FIG. 2).

FIG. 2 shows alternate mounting foot pads 140 which can be utilized for the walking beam drive apparatus 20 when a specific insulation application may require.

Instead of the specialized bearing, e.g. the Thomson "Super Smart" (Trademark) bearing 95 preferably used for ball bushing bearing assemblies 68, 72, yet different bearings can be used. For example, so-called BARDEN (Trademark) bearings, or Ceramic (fired and hardened) sleeve bearings, or TEFLON (Trademark)-lined bearings can be used. However, in a test undertaken in connection with a non-spring protected version of the present invention, the following results were noted, when testing non-pre-loaded bushing designs (of both the BARDEN bearings, and then separately the Ceramic type bearings), against the present split carriage design with pre-loaded bearings, and using Thomson Super Smart (Trademark) bearings:

Two Month Test Data Re: Carriage Backlash—50,000 Cycles

I) TBD* FOR UNLOADED BUSHING DESIGN

A) Barden Non-Pre-Loaded Bushings

| TBD (X-Axis) | TBD (Y-Axis) | TBD (Z-Axis) |
| --- | --- | --- |
| 0.018 (Start Test) | 0.023 | 0.025 |
| 0.034 | 0.023 | 0.020 |
| 0.033 | 0.030 | 0.018 |
| 0.035 | 0.030 | 0.048 |
| 0.035 | 0.032 | 0.048 |
| 0.045 | 0.036 | 0.046 |
| 0.045 (Conclude Test) | 0.036 | 0.045 |

B) Ceramic Bushings (metric)

| TBD (X-Axis) | TBD (Y-Axis) | TBD (Z-Axis) |
| --- | --- | --- |
| 0.010 (Start Test) | 0.014 | 0.010 |
| 0.030 | 0.023 | 0.015 |
| 0.024** | 0.022 | 0.016 |
| 0.021 | 0.032 | 0.032 |
| 0.017 | 0.024 | 0.035 |
| 0.019 | 0.015 | 0.022 |
| 0.016" (Conclude Test) | 0.025" | 0.032 |

II) SPLIT CARRIAGE DESIGN WITH PRE-LOADED THOMSON "SUPER SMART" BEARINGS:

| TBD (X-Axis) | TBD (Y-Axis) | TBD (Z-Axis) |
| --- | --- | --- |
| 0.005 (Start Test) | 0.016 | 0.010 |
| 0.004 | 0.016 | 0.005 |
| 0.004 | 0.016 | 0.004 |
| 0.004 | 0.017 | 0.015 |
| 0.004 | 0.017 | 0.006 |
| 0.004 | 0.017 | 0.008 |
| 0.004 | 0.017 | 0.004 |
| 0.004 | 0.020 | 0.004 |
| 0.004 (Conclude Test) | 0.015 | 0.004 |

*TBD = Total Backlash Detected, in inches, unless otherwise noted.
**Change in measurement method instituted.

Thus, due to the substantial elimination of backlash due to the present cam-actuated drivers construction, such drives are quite advantageous in reducing the overall costs in making walking beam drive assemblies per se. That is, because the present drive unit has minimal backlash, walking beam drives which utilize them do not have to have their respective components held to otherwise tight tolerances, particularly in the part holding fixture rails. Such drive units help eliminate the wear which develops on the tapered lead-in rails typically used in such walking beam drives; thus over time, use of the present drives reduces the need to rebuild such walking beam assemblies as their rails and fixtures inevitably get worn.

Also, as seen, for cost considerations, preferably only a single, non-pre-loaded roller follower is used for each cam (e.g. single followers 90 and 100). Thus, there would normally be fairly substantial resultant backlash problems. However, because of the pre-loaded split carriage, such backlash amounts are greatly minimized.

It will be noted that, due to the fact the lift arm bell crank 102 operates in totally underneath the roller gear cam section 36, a longer translation stroke is provided, and an elongated carriage block 64 (as compared to the shorter style carriage and stroke as present in prior art designs) can be used. This, in turn, permits more separation of the lift arm guide rods 44a, 44b, and hence, a longer tooling mounting plate 46. That provides substantially increased stability to the overall drive unit 20.

The foregoing describes the non-spring protected version, i.e. standard version, of the present walking beam drive apparatus When no relative spring protection is required in a given installation application, i e. where there is no concern about jams of tooling or broken parts causing damage to drive cam components, the walking beam drive apparatus 20 of the present invention can be readily utilized, and with many advantages over prior such drive. However, where spring protection is desired in either the lift or translation directions, then one of the following alternate embodiments should be utilized.

Figure 5:
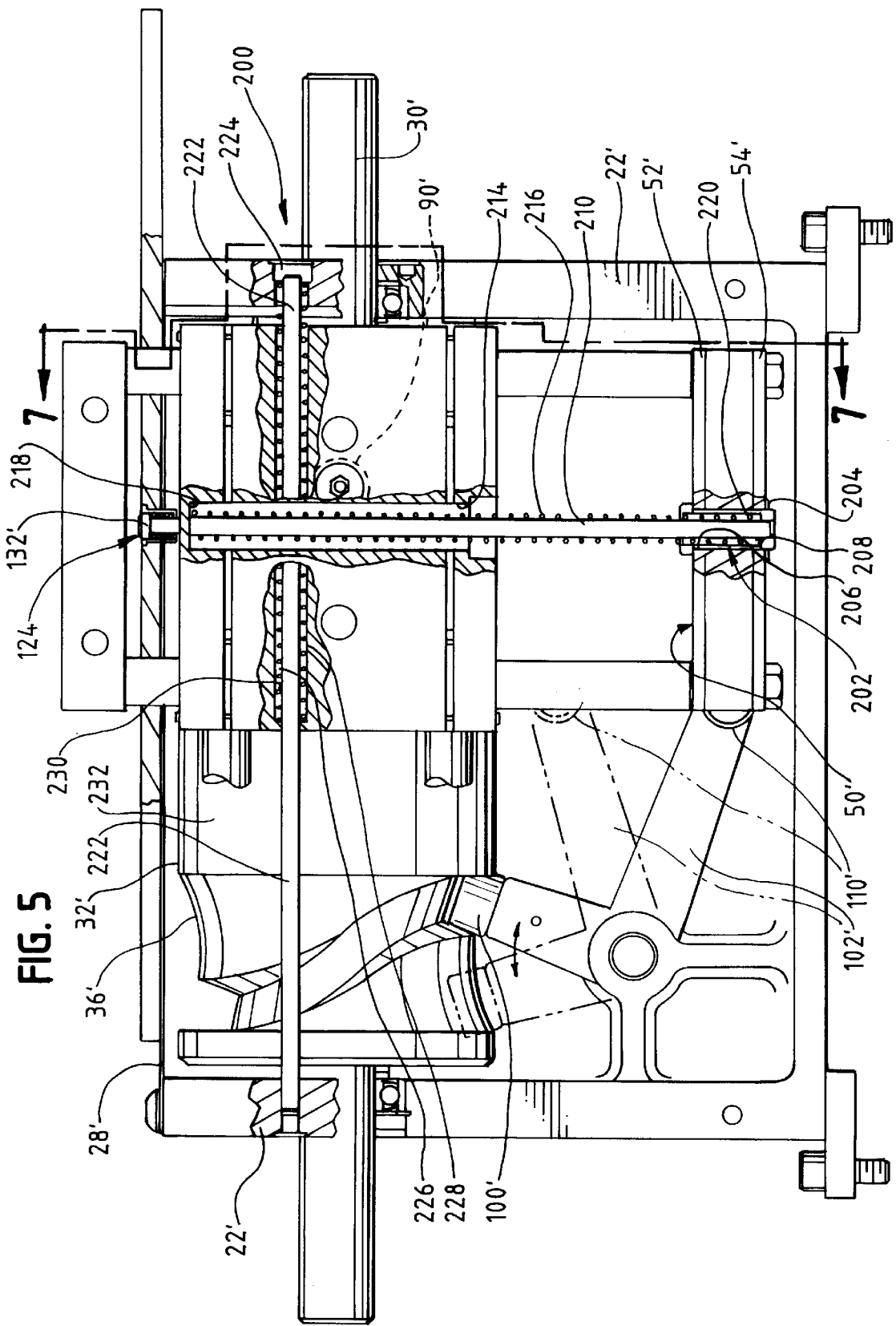
FIG. 5 is a side elevation view of a modified version of the walking beam drive device of the present invention, and depicting certain protection spring and lift plate structure.
Figure 6:
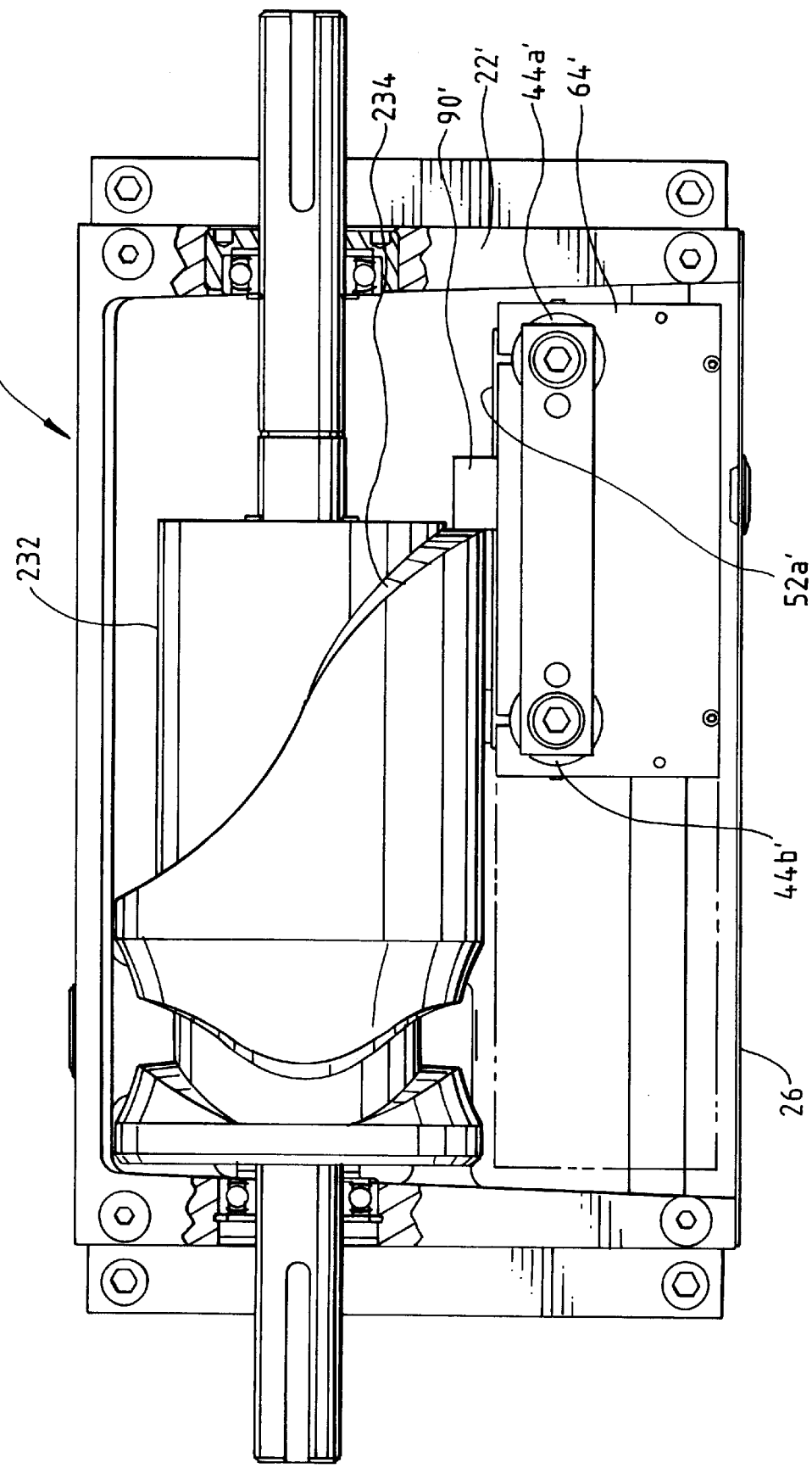
FIG. 6 is a top plan view of the modified drive unit of FIG. 5.
Figure 7:
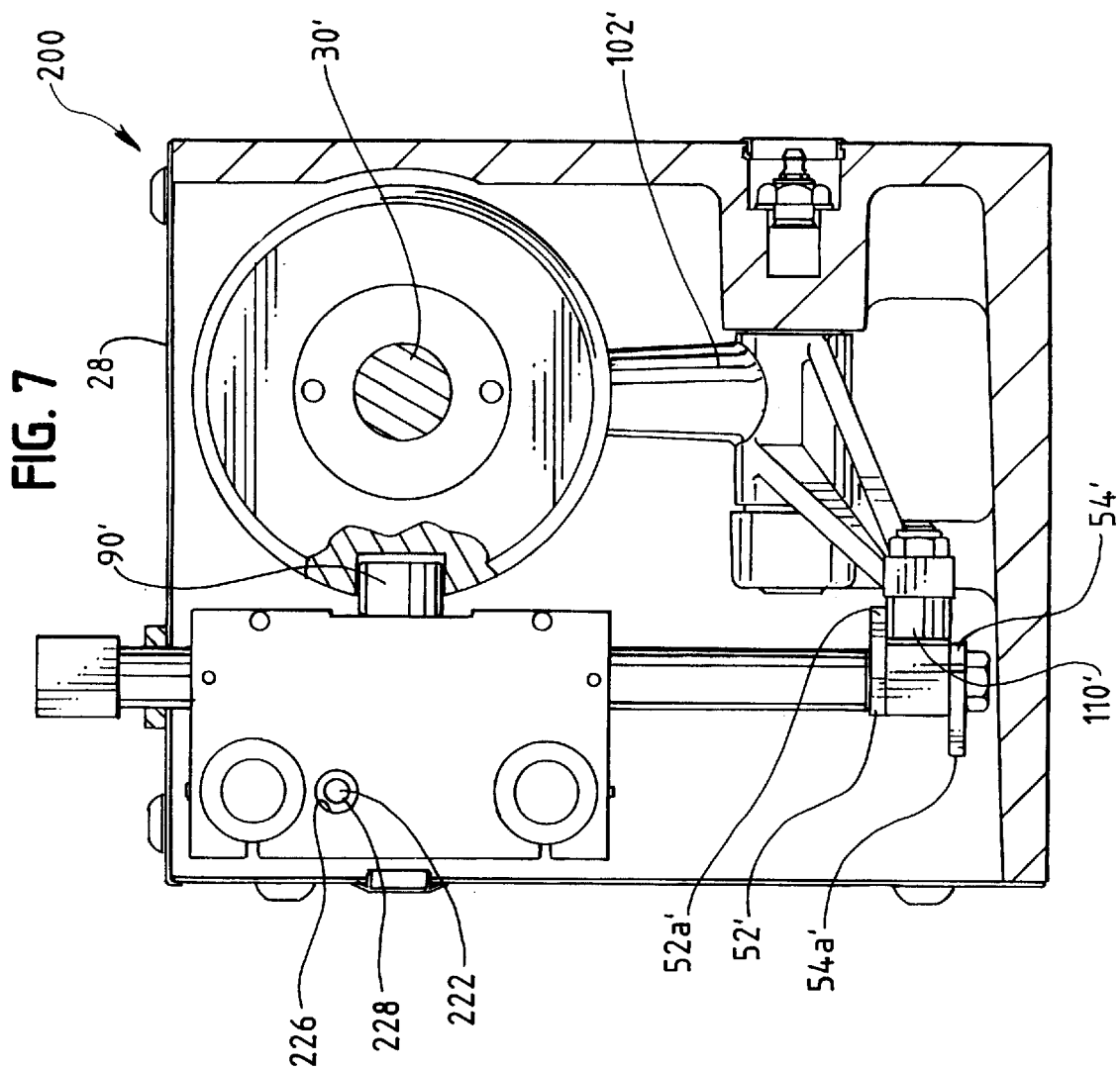
FIG. 7 is a section view, taken along lines 7—7 of FIG. 5, of the modified drive unit.

One alternate embodiment of the present invention is shown in FIGS. 5–7, which modified walking beam drive apparatus is generally denoted by reference numeral 200. (Note that, in describing this modified drive 200, similar reference numerals for common parts as present in walking beam drive apparatus 20 are utilized, except such reference numerals are denoted by a single prime notation.) Thus, drive apparatus 200 is a spring-protected version of the present invention. More specifically, drive apparatus 200 includes a housing 22', side cover 26', top cover 28', and input drive shaft 30'. A unitary cam member 32' is again utilized, but with a special translation cam section 232 (described below) and lift cam section 36'. Translation guide rods 40a' and 40b', and vertical lift guide rods 44a' and 44b' are present.

The lift track assembly 50' is similar to lift track assembly 50 of the preferred embodiment, but with a few exceptions. That is, instead of using bevel washing fastener assembly 60e, a spring tube cup 202 is retained, by a retainer clip 204, within openings 206, 208 respectively formed in the upper lift track plate 52' and lower lift track plate 54'. A lift spring guide rod 210 is fastened at its lower end by a fastener 212 within the spring tube cup 202, and extends upwardly through a spring bore 214 formed in carriage 64'. Rod 210 is fastened within spring bore 214 at its upper end by shoulder screw 132' (of spring cup assembly 124'). A compression spring 216 is placed over and retained by the spring guide rod 210. Spring 216 bottoms out, i.e. bears against, the uppermost end 218 of spring bore 214, and floor 220 of spring tube cup 202.

Further, a translation spring guide rod 222 is secured at its left end (FIG. 5) in left housing wall 23' (FIG. 5), and at its rightmost end by hollow set screw 224 and right housing wall 23'. As seen, the translation guide rod 222 extends through a spring bore 226 formed in carrier 64'. A compression spring 228 is fitted over and retained by translation guide rod 222. The leftmost end (FIG. 5) of compression spring 228 bottoms out against the end wall 230 of spring bore 226, while its rightmost end (FIG. 5) bottoms against, and is given proper spring compression (via tightening) by a hollow set screw 224 fastened in wall 23'.

There are also other differences between the structure comprising modified drive apparatus 200 versus the previously described drive apparatus 20. That is, while the lift cam section 36' is again preferably formed as a roller gear cam, and the translation cam section 232 is again formed as a single track barrel cam unit, it will be noted that barrel cam track 234 has its normal rightmost track portion removed on the translation cam 232 (See FIG. 6). This removal of a portion of the drive cam track 234 assists in the "protection" provided with this embodiment, as discussed further below.

Further yet, the specific directional placement, during assembly, of the respective upper and lower lift track plates 52', 54' is different. That is, while upper plate 52' is positioned so that its extension portion 52a' extends to the right (FIG. 7), so as to lie over, and hence drive, drive roller 110, the lower lift track plate 54' is reversed (relative to its positioning in drive apparatus 20). Thus, the extension track portion 54a' extends away from, and is unable to engage, the drive roller follower 110'. This reversal of location for lower lift track plate 54a' is important in the spring protection feature provided in the vertical direction by modified drive apparatus 200. It will be understood that, since the spring 216 (as operating within and retained by the respective spring tube cup 202 and spring bore 214), is a compression spring, it always seeks to drive down, i.e. bias downwardly, the lift track assembly 50'. Thus, except when the lift bell crank 102', via the drive roller follower 110', is seeking to raise the lift track assembly 50', compression spring 216 always forces the lift track assembly 50' (and associated lift guide rods 44a', 44b' and mounting block 46') to the lowermost position, shown in solid in FIG. 5. Then, when the drive roller follower 110' is rotated upwardly to its phantom position in FIG. 5, the lift track assembly 50' (and associated components) are raised and the compression spring 216 is compressed, thus further seeking to again bias downwardly the lift track assembly 50' to its lowermost position (see FIG. 5).

However, a jam may be encountered in the vertical retraction mode (i.e. lowering mode) of lift track assembly 50', e.g. as might be encountered by any workpiece tooling, not shown, mounted to tooling mounting plate 46'. In that situations even though the drive roller follower 110' would continue to rotate to its lowermost position (FIG. 5), the lift track assembly 50' would stop at the position wherever the jam was encountered. This is because, for modified drive apparatus 200, the lower lift track plate 54' has its extension portion 54a' mounted away from, and thus out of potential engagement with, drive roller 110. Thus, spring protection is provided in the vertical retraction mode by drive unit 200.

Further, because of the presence of the translation compression spring 228 (as operating within spring bore 226 along fixed translation spring guide rod 222), protection in the extended translation direction (i.e. to the left in FIG. 5) is also provided. More specifically, it will be understood that compression spring 228 is pre-loaded via hollow set screw 224, always seeking to force split carriage 64' to the left in FIG. 5. Thus, spring 228 is always tending to bias roller follower 90' against the single face barrel cam track 234. Then, if a jam causes the leftward translation FIG. 5 to stop for plate 46' and thus carriage 64', the drive roller follower 90' simply proceeds to "lift off" the single side-single cam track 234, while the latter continues to rotate. Thereafter, further rotation of cam 232 causes the cam track 234 to re-engage roller follower 90', now driving it to the right (FIG. 6). This acts to translate the tooling plate 46' away from the jam condition. In this way, spring protection is provided for this alternate embodiment, i.e. cam drive apparatus 200, in the both the translation extension mode, and the vertical retraction mode.

Figure 8:
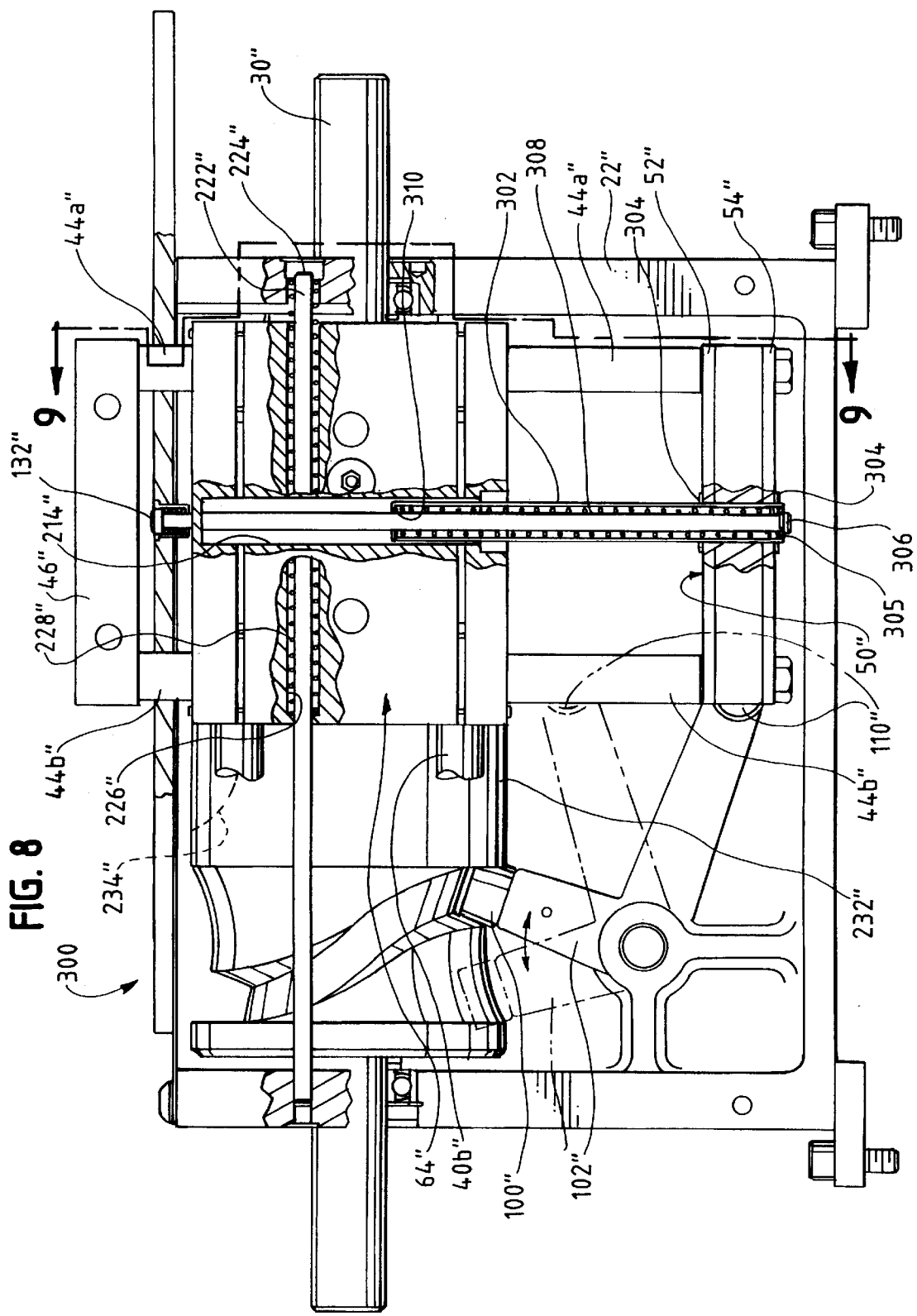
FIG. 8 is a side elevation view of yet another modified version of the drive unit of FIG. 5, with alternate protection spring and lift plate structure.
Figure 13:
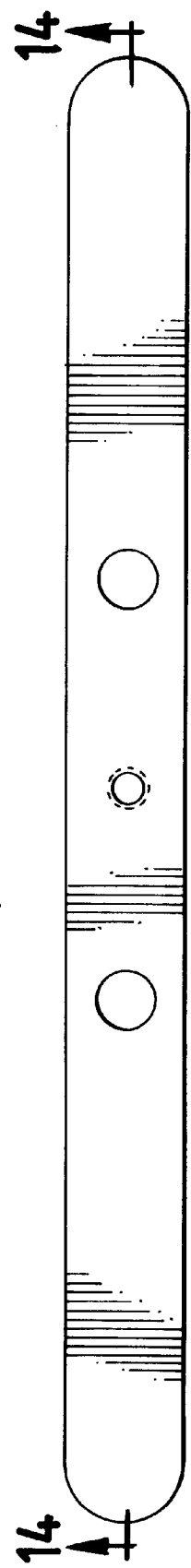
FIGS. 13 and 14 are a plan view and section view of the sliding dust cover respectively.
Figure 14:

Yet another alternate embodiment of the present invention is shown in FIGS. 8–9, where a modified walking beam drive apparatus is generally denoted by reference numeral 300. (Note that when describing this modified drive 300, similar reference numerals for common parts as present in walking beam drives 20 and 200 are utilized, except such common reference numerals are here denoted by a double prime notation) Drive apparatus 300 is again a spring-protected version of the present invention. More specifically, drive apparatus 300 includes a housing 22", side walls 23", side and top covers 26", 28", and input shaft 30". Besides the respective translation guide rods 40a", 40b", and vertical lift guide rods 44a", 44b", the lift track assembly 50" is the similar to lift track 50 in the preferred embodiment, but with a few exceptions.

Instead of using bevel washer fastener assembly 60, an elongated spring tube 302 is placed through the bores 206", 208" of the respective lift track plates 52", 54". That spring tube 302 is held in place by respective retainer clips 304. The lift spring guide rod 210" is retained in place (within spring tube 302) at its upper end within spring bore 214" by the shoulder screw 132". A compression spring 308 is retained over guide rod 210", and contained within spring tube 302. The spring 308 is retained at its lower end by a washer 305 and the fastener 306, and bottoms out at its upper end against the upper inner surface 310 of spring tube 302.

It will be noted that the respective orientation of the upper lower lift track plates 52", 54" is reversed (versus their arrangement in the prior embodiment, i.e. above described unit 200). More specifically, see FIG. 9, the upper lift track plate 52" is so positioned that its extension portion 52a" extends to the left (in FIG. 9), and thus, away from engagement with drive roller 110". Also, lower lift plate 54" is so positioned that its extension more 54a" extends to the right (FIG. 9), and thus, is operable to engage drive roller 110".

It will be noted that the drive unit 300 again includes the extended-translation spring protection features and structure of spring protected drive unit 200. These include translation spring guide rod 222", spring bore 226", compression spring 228", as well as a translation cam section 232" that again has only a single face, single barrel cam track 234", i.e. which is relieved on the right side (just the same as barrel cam 232 is in the second embodiment i.e. drive unit 200). Note FIG. 6, for example.

The vertical spring protection provided by this alternate drive unit 300 is, thus, the reverse of that provided by drive 200. That is, with drive 300, there is spring protection available in the raised or extended vertical mode, but none present in the lowered or retracted vertical mode.

More specifically, compression spring 308 always tends to raise the lift track assembly 50, and particularly the extension portion 54a" of lower lift guide track 54", against drive roller follower 110 This occurs regardless what lift position that roller follower is in. That is, since the compression spring 308 is secured at the bottom of spring guide rod 310 with washer 305 and fastener 306, and the tube itself moves within the spring bore 214", the spring is always tending to bias the lower lift track plate 54" against drive roller follower 110. Thus, as roller gear lift cam 36" causes roller follower 100", and hence lift arm 102", to drive the drive roller 110" upwardly (to its uppermost phantom position in FIG. 8), the upward biasing action of compression spring 308 causes lower lift track guide plate 52" to maintain engagement with drive roller follower 110".

However, if a jam is encountered, such as by tooling mounting plate 46", that stops (via blocked lift guide rods 42a", 42b") any further upward lift extension (via upward biasing of compression spring 308). Instead, further upward driving lift (via lift arm 102") of drive roller follower 110" simply causes that drive roller follower to "lift off" of the now stopped extension portion 54a" of the lower plate 54", and the damage is prevented.

Thus, as seen, this additional embodiment, i.e. drive unit 300, provides a specific type of spring protection for the cam drive components, namely protection in the vertical extension mode, as well as protection in the horizontal translation extension mode.

It will be noted that, even though the various above-described embodiments produce different types of protection, nevertheless common parts can be utilized to save overall expense of manufacturing and assembling the drive units 20, 200, and 300. Depending on a given end user's ordering specifications, the unit can be custom manufactured, to have the correct placement of lift guide track plates 52", 54". Then, either compression spring 308 and elongated spring tube 302e or instead, spring cup 202 and spring 216 are used. Also, cam structure is selected as having either a double side cam track 36, or a single side single track barrel cam 232".

From the foregoing, it is believed that those skilled in the art will readily appreciate the unique features and advantages of the present invention over previous types of cam-actuated drives for walking beam assemblies. Further, it is to be understood that while the present invention has been described in relation to particular preferred and alternate embodiments as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

We claim:

1. A cam-actuated drive apparatus having a housing, for providing output drive motion in two axes, comprising in combination;

input shaft mounted for rotation on the housing;

a translation cam member driven by said input shaft;

a lift cam member driven by said input shaft;

a translation guide rod means mounted on said housing;

a carriage means having translation bore means and lift bore means, said lift bore means being in a direction perpendicular to said translation bore means, said carriage means mounted for sliding oscillation along said translation guide rod means through said translation bore means;

a first follower member mounted on said carriage, said first follower member engaged with said translation cam member so as to drivably oscillate said carriage means along said translation guide rod means;

a lift arm bell crank member mounted for pivotal movement on said housing and positioned substantially underneath said lift cam member, thereby permitting full translation movement of said carriage means along said translation guide rod means said lift arm bell crank member having a second follower member mounted thereon said second follower member engaged with said lift cam member; and lift guide rod means slidably received within said lift bore means of said carriage means, and driven by said lift arm bell crank member and an associated lift track member, said lift track member driven by said lift arm bell crank member.

2. The invention of claim 1, and wherein said lift cam member comprises a roller gear cam.

3. The invention of claim 2, and wherein said translation cam member is a barrel cam.

4. The invention of claim 1, and wherein said translation cam member and said lift cam member are separate components mounted on said input shaft.

5. The invention of claim 1 and pre-loadable ball bushing bearing means retained respectively within said translation bore means about said translation guide rod means and within said lift bore means about said lift guide rod means.

6. The invention of claim 5, and wherein said carriage means includes respective translation slot means formed adjacent said translation bore means and lift slot means formed adjacent said lift bore means, said carriage means further including tightening means for each of said respective translation slot means and lift slot means, whereby tightening of said tightening means effects pre-loading of said respective ball bushing bearing means within said respective translation bore means and lift bore means.

7. The invention of claim 6, and wherein said respective ball bushing bearing means are self-alignable.

8. The invention of claim 1, and said housing including a cover plate member having a translation opening formed therein to permit oscillating translation movement of said lift guide rod means along said housing as said lift guide rod means is driven by said translating carriage means, and a dust cover plate mounted on said carriage means and slidably engaging said cover plate member and operable to close off said translation opening.

9. The invention of claim 8, and including spring biasing means connecting said dust cover plate to said carriage means and adapted to bias said dust cover plate against said cover plate member.

10. The invention of claim 1, wherein said translation guide rod means comprises two translation guide rod members, and said lift guide rod means comprises two lift guide rod members.

11. The invention of claim 1, and lift protection spring means mounted on said carriage means and adapted to provide protection of said drive apparatus during vertical drive movements thereof, said spring means being entirely enclosed within said housing.

12. The invention of claim 11, wherein said carriage means includes a lift spring bore, and said lift protection spring means comprises a lift spring member retained within said lift spring bore.

13. The invention of claim 12, and wherein a lift spring guide rod is mounted within said lift spring bore and adapted to guide said lift spring member.

14. The invention of claim 11, wherein said carriage means includes a translation spring bore, and said translation protection spring means comprises a translation spring retained within said translation spring bore.

15. The invention of claim 14, and wherein a translation spring guide rod is mounted within said translation spring bore and adapted to guide said translation spring.

16. The invention of claim 1, and translation protection spring means mounted on said carriage means and adapted to provide protection of said drive apparatus during translation drive movements thereof.

17. The invention of claim 16, and wherein said translation cam member is a single face, single track cam.

18. The invention of claim 1, wherein said lift track member comprises an upper lift track plate and a lower lift track plate separated by a plate spacer, a drive roller rotatably mounted on said lift arm bell crank member opposite said second follower member is enclosed between said upper and lower lift track plate, whereby said lift track member is engaged with said lift arm bell crank member.

19. The invention of claim 18 further comprising an opening in each of said upper lift track plate and said lower lift track plate, a spring tube cup received in said openings, a lift spring guide rod fastened at a lower end thereof within said spring tube cup and extending vertically through and terminating at an upper end of a spring guide rod bore in said carriage means, and a compression spring extending coaxially with and retained by said spring guide rod and bearing against said upper end of said spring guide rod bore and said spring tube cup, said compression spring biasing said lift track plate toward its lowermost position whereby spring protection is provided in the vertical direction.

20. The invention of claim 19, wherein said lift spring guide rod is fastened to said carriage means by fastening means located at said upper end of said spring guide rod bore.

21. The invention of claim 18, further comprising an opening in each of said upper lift track plate and said lower lift track plate, an elongated spring tube extending through said openings, a lift spring guide rod fastened to said lower lift track plate and retained within said elongated spring tube, said lift spring guide rod extending vertically through and terminating at an upper end of a lift spring guide rod bore within said carriage means, a compression spring extending coaxially with and retained between said spring guide rod and said spring tube, said compression spring having a top end bearing against an upper end of said spring tube and a bottom end fastened to said lift track.

22. The invention of claim 21, wherein said compression spring is fastened to said lift track by means of a washer and a fastener located at an underside of said lower lift track plate.

23. The invention of claim 1, further comprising a translation spring guide rod extending between said pair of parallel side walls, a translation spring guide rod bore extending horizontally through said carriage means and receiving a portion of said translation spring guide rod, a compression spring extending coaxially with and retained by said translation spring guide rod by said translation spring guide rod, said compression spring having a first end fixed to one of said side walls and a second end fixed to one end of said translation spring guide rod bore, said compression spring biasing said carriage means toward said first end of the compression spring, whereby spring protection is provided in the horizontal direction.

24. The invention of claim 1, and spring-operated protection means providing protection of the drive apparatus in both the lift and translation axes in respective alignment with said lift bore means and said translation bore means.

25. A cam-actuated drive apparatus for imparting lift and translational output motion comprising:
   a housing including a base and at least one pair of parallel sidewalls;
   an input shaft rotatably mounted in one of said sidewalls;
   a dual-cam member driven by said input shaft, said dual-cam member including a roller gear cam and a barrel cam, said roller gear cam including a roller cam track therein and said barrel cam including a barrel cam track therein,
   one or more translation guide rods mounted horizontally within said housing and extending between a pair of said parallel sidewalls;
   one or more lift rods mounted vertically on a lift track;
   a carriage means mounted on said translation guide rods, said carriage means including
   a) one or more translation bores therethrough to receive said translation guide rods, each of said translation bores provided with translation bearing means to facilitate movement of said carriage means along said translation guide rods,
   b) one or more lift bores therethrough to receive said lift rods, each of said lift bores provided with lift bearing means to facilitate movement of said carriage means along said lift rods, and
   c) a cam follower projecting outwardly from a side of said carriage means and in communication with said barrel cam track, whereby said carriage means is driven by said barrel cam along said translational guide rods; and
   an oscillating lift arm bell crank positioned substantially underneath said dual-cam member and having a first end drivably mounted to said lift track, a bell crank elbow rotatably mounted within said housing, and a second end having a drive roller in communication with said roller cam track, whereby said lift arm bell crank oscillates between an extreme first position and an extreme second position, thereby causing said lift track and said lift rods to oscillate between raised and lowered positions.

26. The cam-actuated drive apparatus of claim 25, wherein each of said translation bores in said carriage means has associated therewith a translation rod slot extending the length of said translation bore, said translation rod slot provided with pre-loading fastening means for tightening said carriage member around said translation bearing means and said translation guide rods.

27. The cam-actuated drive apparatus of claim 25, wherein each of said lift bores in said carriage means has associated therewith a lift rod slot extending the length of said lift bore, said lift rod slot provided with pre-loading fastening means for tightening said carriage-member around said lift bearing means and said lift guide rods.

28. The cam-actuated drive apparatus of claim 25, wherein said carriage means is provided with lubrication means to facilitate movement of lubrication along said translation guide rods and said lift rods.

29. The cam-actuated drive apparatus of claim 28, wherein said lubrication means includes a grease fitting and a plurality of grease supply bores in communication with each of said translation bores and each of said lift bores.

30. The invention of claim 25, and lift protection spring means mounted on said carriage means and adapted to provide protection of said drive apparatus during vertical drive movements thereof, said spring means being entirely enclosed within said housing.

31. The invention of claim 30, wherein said carriage means includes a lift spring bore, and said lift protection spring means comprises a lift spring member operating within said lift spring bore, and engaged at one end to said lift track.

32. The invention of claim 31, and wherein a lift spring guide rod is mounted within said lift spring bore and adapted to guide said lift spring member.

33. The invention of claim 25, and translation protection spring means mounted on said carriage means and adapted to provide protection of said drive apparatus during translational drive movements thereof.

34. The invention of claim 33, wherein said carriage means includes a translation spring bore, and said translation protection spring means comprises a translation spring operating within said translation spring bore.

35. The invention of claim 34, and wherein a translation spring guide rod is mounted within said translation spring bore and adapted to guide said translation spring.

* * * * *

UNITED STATES PATENT AND TRADEMARK OFFICE
CERTIFICATE OF CORRECTION

PATENT NO. : 5,904,065
DATED : May 18, 1999
INVENTOR(S) : Frank H. Koller et al

It is certified that error appears in the above-identified patent and that said Letters Patent is hereby corrected as shown below:

Claim 1, Column 11, Line 27, before "input" insert --an--.

Claim 1, Column 11, Line 38, after "carriage" insert --means--.

Claim 5, Column 11, Line 62, after "1" insert --,--.

Claim 26, Column 14, Line 23, after "carriage" delete "member" and insert --means--.

Claim 27, Column 14, Line 29, after "carriage" delete "member" and insert --means--.

Signed and Sealed this

Twenty-eighth Day of December, 1999

Attest:

Q. TODD DICKINSON

Attesting Officer

Acting Commissioner of Patents and Trademarks